J. C. GEBHART.
APPARATUS FOR MEASURING RIBBON.
APPLICATION FILED NOV. 23, 1917.
1,273,766.
Patented July 23, 1918.
2 SHEETS—SHEET 1.
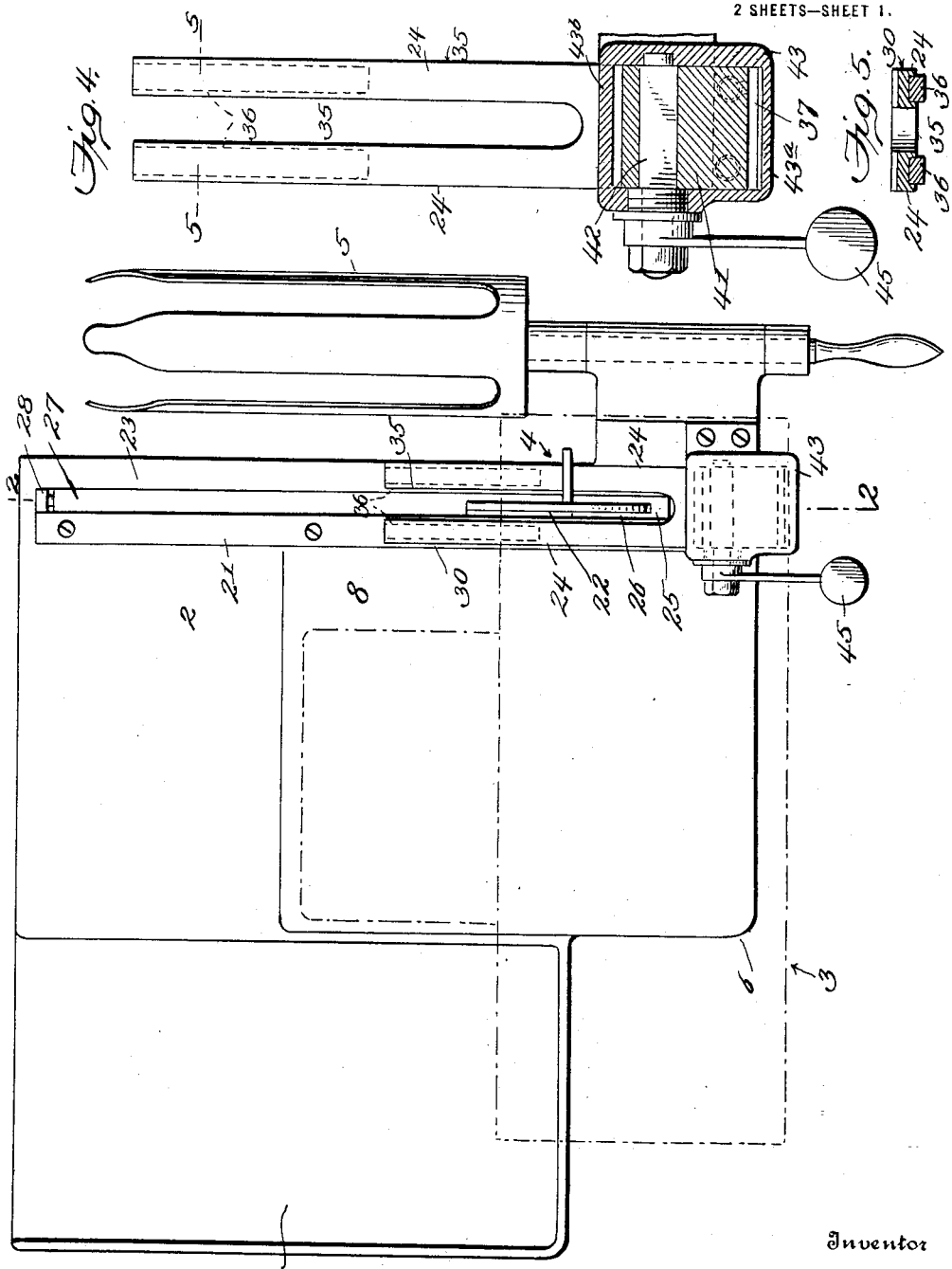

J. C. GEBHART.
APPARATUS FOR MEASURING RIBBON.
APPLICATION FILED NOV. 23, 1917.
1,273,766.
Patented July 23, 1918.
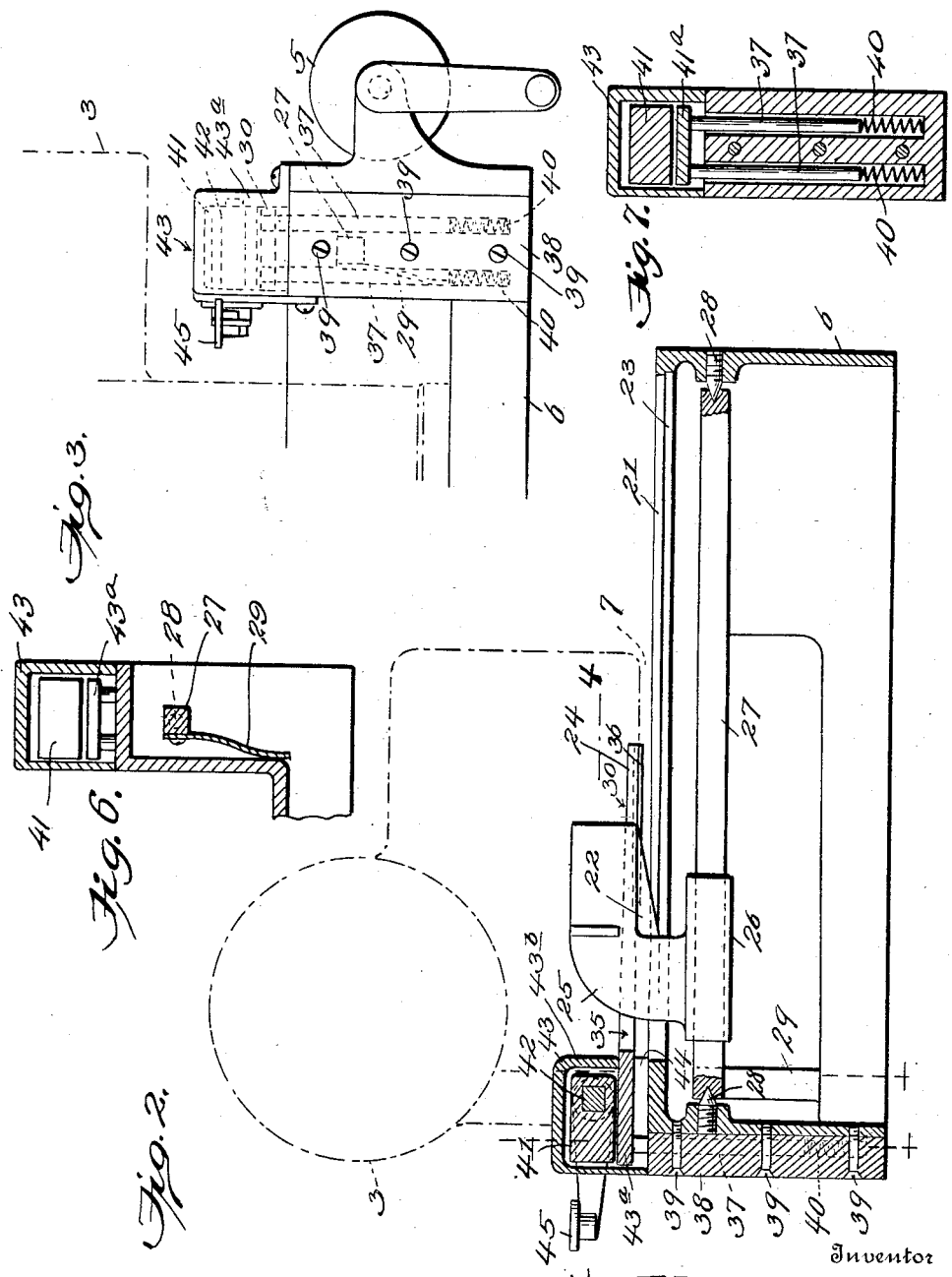

UNITED STATES PATENT OFFICE.

JOHN C. GEBHART, OF ST. LOUIS, MISSOURI, ASSIGNOR TO THE ECONOMETER CO., OF ST. LOUIS, MISSOURI, A CORPORATION OF MISSOURI.

APPARATUS FOR MEASURING RIBBON.

1,273,766.  Specification of Letters Patent.  Patented July 23, 1918.

Application filed November 23, 1917. Serial No. 203,620.

*To all whom it may concern:*

Be it known that I, JOHN C. GEBHART, a citizen of the United States, residing at St. Louis, in the county of St. Louis and State of Missouri, have invented new and useful Improvements in Apparatus for Measuring Ribbon, of which the following is a specification.

This invention relates to improvements in apparatus for measuring ribbons or fabric of similar relatively narrow width and sleazy nature. The apparatus to which the improvements relates is of the broad or general type disclosed in my Letters Patent, No. 1,250,845, granted December 18, 1917, the characteristics of which are that the ribbon, supported in a trough-like holder, is drawn by means of a reel through a measuring machine and, when the measuring operation has been completed, is severed by means of a suitable cutter, the cutter being, of course, located at one side of the measuring machine.

The present improvements are concerned more particularly with the cutter and with a ribbon gripping or clamping device in association therewith, as elements of an apparatus of the type referred to; and the objects of the invention are to insure that the ribbon shall be accurately and cleanly cut and, if it be of sleazy material, that its edge portions where the cut is made are not injured or impaired; and also to provide exceedingly simple and reliable constructions of ribbon cutting and gripping devices.

With the above objects in view the invention consists in certain novel features of structure, combination and relation which will be set forth in detail as the description proceeds.

An embodiment of the invention is illustrated in the accompanying drawings, wherein:—

Figure 1 is a plan view of an apparatus in which the features of the invention are incorporated.

Fig. 2 is a vertical sectional view on the line 2—2 of Fig. 1.

Fig. 3 is a fragmentary side elevation of that portion of the apparatus with which the gripping device is associated.

Fig. 4 is a detail view of the gripping device, partly in section on the line 4—4 of Fig. 2.

Fig. 5 is a detail cross-sectional view on the line 5—5 of Fig. 4.

Figs. 6 and 7 are detail sectional views on the respective lines 6—6 and 7—7 of Fig. 2.

Similar characters of reference designate corresponding parts throughout the several figures.

The apparatus of which the present invention forms an element includes a trough 1 in which is placed the bolt or cylinder from which the ribbon is to be unwound, a flat table 2 adjoining the trough at one side thereof, a length measuring machine 3 (shown diagrammatically in broken lines), a cutting device 4 by which a measured length of ribbon may be completely severed, and a reel 5 by which the fabric is unwound from the bolt and drawn through the measuring machine 3 and upon which the measured length of fabric is re-wound.

The trough 1 and table 2 are preferably formed integral with or as component parts of a base 6 from which all the elements of the apparatus are supported.

The measuring machine is preferably of a construction capable of separate use and is preferably a separate element of the apparatus. It is arranged at one end of the table 2 and its casing has in three of its walls a slot 7 in register with its roller pass and through which the ribbon or an edge portion of the ribbon is led. In the embodiment disclosed, which is adapted to a measuring machine of the type illustrated in my Letters Patent, No. 1,252,258, granted January 1, 1918, the said machine is suitably mounted in a depression or recess 8 of the base 6 which is formed at the end of the table 2 and inward of the adjacent end of the trough 1. The recess 8 accommodates the lower portion of the measuring machine, enabling said machine to be positioned in immediate juxtaposition to the adjacent end of the table 2 with its roller pass in substantially the same plane as said table; and said recess by virtue of its described location is overhung by the marginal portion of the ribbon as the latter is drawn across the table 2.

The cutting device is, of course, located beyond the measuring machine and consists of a fixed transverse blade 21 flush with the table 2 and a transversely movable blade 22. The blade 22 adjoins a transverse slot in which the lower or cutting portion of the blade 22 operates. According to the invention the blade 22 is carried by a bracket 25 which projects through the slot 23 and at its lower end is provided with a collar 26 slidably mounted on a transverse rod 27 which is supported below the table 2 and between the sides of the base 6 and is utilized not only as a guide and support for the bracket 25 but also to effect the contact of the blade 22 with the fixed blade 21. For this purpose said rod is mounted to rock on end supporting bearings 28, has a square cross-section to which the collar 26 conforms and is provided at one end with a depending leaf spring 29 which bears laterally against an adjacent wall or web of the base 6 and holds said rod in a position, relatively to its pivotal axis, whereby the blade 22 is pressed against the side of the blade 21.

According to the invention the ribbon is securely gripped adjacent the slot 23 during the measuring operation, in order that it may be accurately and cleanly cut and that the end portions of the ribbon where the cut is made shall not be injured or impaired; and the device employed includes a transverse clamping leaf 30 which, in order that the ribbon may be gripped at both sides of the slot 23 and, as preferred, is bifurcated to provide a pair of parallel gripping fingers 24 and an intermediate recess 35 registering with the slot 23 and accommodating the bracket 25.

The leaf 30 preferably has rectilineal movement toward the table 2 whereby it may be uniformly effective throughout the entire extent of its working portion in securely gripping the ribbon to be cut, the said working portion of said leaf being preferably provided with inset gripping strips 36 of rubber or other friction material.

For the purpose of such rectilineal movement the leaf is provided at its inner end and in perpendicular relation thereto with a pair of depending stems 37, and a block 38 having recesses in which said stems have a close sliding fit is secured, preferably by screws 39, to a side wall of the base 6, the recesses being of greater depth than the stems 37 and in their lower portions inclosing helical springs 40 upon which the lower ends of the stems 37 rest, the said springs acting expansively to move said stems and, with them, the leaf 30, upward.

For its operation, the leaf 30 is engaged from above by a pivotally movable arm 41 which is mounted on a rock-shaft 42 disposed transversely of said leaf. The rock-shaft 42 has its bearings in a casing 43 which incloses the arm 41 and the inner portion of the leaf 30, the said casing having a wall 43ª which at its lower end abuts the block 38 and an opposite wall 43ᵇ which terminates suitably short of the table 2, thereby to provide a slot 44 through which the leaf projects, the said wall 43ᵇ serving to limit the upward movement of said leaf by the springs 40. The shaft 42 projects beyond the casing 43 and at one end, preferably the end adjoining the measuring machine, is provided with an operating lever 45.

The springs 40 maintain the leaf 30 normally spaced above the table 2 whereby the ribbon is wound upon the reel 5 and will have free passage between said leaf and table. When the measuring operation has been completed the lever 45, which preferably projects outward from the base 6, is depressed and effects a downward pivotal movement of the arm 41 which, acting upon the inner portion of the leaf 30, moves said leaf downward toward the table 2 and against the pressure of the springs 40. It is to be noted that the leaf is somewhat springy or resilient and that the strips 38 will engage the ribbon before the downward movement of the inner portion of the leaf by the arm 41 is completed. The effect of the continued downward movement of the inner portion of the leaf is to increase the pressure with which the strips 38 bear upon the ribbon to a degree which will insure that the ribbon, however thin or delicate, will be securely held during the cutting operation as effected by the transverse movement of the blade 22. When the cutting operation has been completed the lever 45 is released at which time the springs 40 are effective to re-set the parts, said springs raising the leaf and through the intermediary of the leaf returning the arm 41 and lever 43 to normal position.

Having fully described my invention, I claim:—

1. In an apparatus of the class described, in combination, a table having a transverse slot, a movable blade operating throughout the length of the slot, a leaf located adjacent one end of the slot for coöperation with the table in gripping the fabric to be cut by the blade, stems rigid with the leaf and projecting angularly from its inner end, and a block adjacent the inner end of the leaf in which said stems have a close sliding fit, thereby to direct the leaf, when depressed, rectilineally toward the table.

2. In an apparatus of the class described, in combination, a table having a transverse slot, a movable blade operating throughout the length of the slot, a leaf located adjacent one end of the slot for coöperation with the table in gripping the fabric to be cut by the blade, the leaf having its outer end provided with gripping strips, means adjacent the inner end of the leaf for directing the leaf rectilineally toward the table when depressed, and means acting on the inner end of the leaf for depressing the same.

3. In an apparatus of the class described, in combination, a table having a transverse slot, a movable blade operating throughout the length of the slot, a leaf located adjacent one end of the slot for coöperation with the table in gripping the fabric to be cut by the blade, stems depending from the inner end of the leaf, a block fitted to the table adjacent the inner end of the leaf and having recesses in which the stems have a close sliding fit, said recesses inclosing springs which act on the lower ends of the stems to move them upward, and means acting on the inner portion of the leaf from above to move the leaf against the table.

4. In an apparatus of the class described, in combination, a table having a transverse slot, a movable blade operating throughout the length of the slot, a leaf located adjacent one end of the slot for coöperation with the table in gripping the fabric to be cut by the blade, stems depending from the inner end of the leaf, a block fitted to the table adjacent the inner end of the leaf and having recesses in which the stems have a close sliding fit, said recesses inclosing springs which act on the lower ends of the stems to move them upward, a rock shaft arranged transversely of and above the leaf and having an operating lever and an arm on said rock shaft for engagement with the inner portion of the leaf to move the leaf against the table when the rock shaft is operated.

5. In an apparatus of the class described, in combination, a table having a transverse slot, a movable blade operating throughout the length of the slot, a frictional gripping device normally spaced above the table and located adjacent one end of the slot, and means acting on the inner end of said gripping device and operable to cause the same to grip the material during the operation of the blade, said blade and gripping device being separately mounted.

6. In an apparatus of the class described, in combination, a table having a transverse slot, a movable blade operating throughout the length of the slot, a transverse leaf normally spaced above the table and mounted adjacent one end of the slot and separately from the blade for movement toward and from the table, said leaf being of bifurcated form and having frictional gripping fingers located at opposite sides of the slot and a recess registering with the slot and means for operating said leaf and acting on the inner end thereof whereby its fingers grip the material during the operation of the blade.

7. In an apparatus of the class described, in combination, a table having a transverse slot, a movable blade operating throughout the length of the slot, a frictional gripping device adapted to engage the material at both sides of the slot and having a recess to accommodate said blade, said blade and gripping device being separately mounted and said gripping device being normally spaced above the table, and means acting on the inner end of said gripping device for operating the same to grip the material during the operation of the blade.

8. In an apparatus of the class described, in combination, a table having a transverse slot, a fixed blade adjoining one edge of said slot, a blade movable lengthwise of the slot and coöperating with the fixed blade, a bracket projecting through the slot and carrying the movable blade, a transverse rod supported below the table and having end bearings about which it may pivot, said bracket having a collar slidable on said rod and non-rotatably associated with said rod, and a spring acting on said rod to hold it in a position wherein said movable blade is pressed laterally against said fixed blade.

9. In an apparatus of the class described, in combination, a table having a transverse slot, a fixed blade adjoining one edge of said slot, a blade movable lengthwise of the slot and coöperating with the fixed blade, a bracket projecting through the slot and carrying the movable blade, a transverse rod supported below the table and having end bearings about which it may pivot, said bracket having a collar slidable on and non-rotatably associated with said rod and means acting on said rod to hold it in a position wherein said movable blade is pressed laterally against said fixed blade.

10. In an apparatus of the class described, in combination, a table having a transverse slot, a fixed blade adjoining one edge of said slot, a blade movable lengthwise of said slot and coöperating with the fixed blade, a bracket projecting through the slot and carrying the movable blade, and a transverse rod supported below the table and having end bearings about which it may pivot, said bracket having a collar slidable on and non-rotatably associated with said rod.

In testimony whereof I have hereunto set my hand in presence of two subscribing witnesses.

JOHN C. GEBHART.

Witnesses:
 TED UHLEMEYER,
 WALTER ROBERT MANTELL.